A. C. HURLEY.
MANURE DRILLS.
No. 191,682. Patented June 5, 1877.
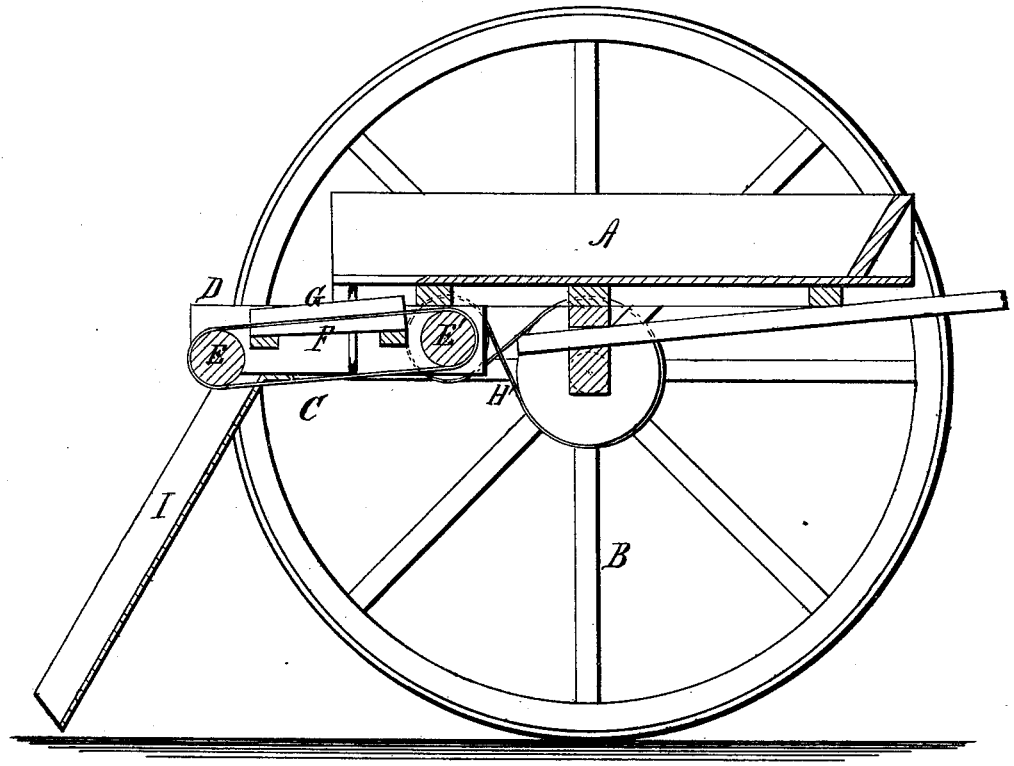
WITNESSES:
A. B. Robertson
Colon C. Kennon
INVENTOR:
Asa C. Hurley
BY
ATTORNEYS.

UNITED STATES PATENT OFFICE.

ASA C. HURLEY, OF PURDY, TENNESSEE.

IMPROVEMENT IN MANURE-DRILLS.

Specification forming part of Letters Patent No. 191,682, dated June 5, 1877; application filed June 7, 1875.

*To all whom it may concern:*

Be it known that I, ASA C. HURLEY, of Purdy, in the county of McNairy and State of Tennessee, have invented a new and Improved Manure-Drill; and I do hereby declare that the following is a full, clear, and exact description of the same, reference being had to the accompanying drawing, forming a part of this specification, in which the figure is a vertical longitudinal section.

This invention relates to certain improvements in apparatus for sowing and distributing fertilizers; and it consists in the combination, with a detachable frame adapted to be applied to any cart, of a continuous revolving apron or belt, which receives the manure or other fertilizer, and conveys the same from the tail of the cart to which the apparatus is attached down through a chute to the ground, the said apron being stretched over rollers, which are made to revolve through a connection with the main driving-wheels.

In the drawing, A represents the body of an ordinary cart, mounted upon wheels B. C is the attachment which constitutes my improvement. The said attachment consists of the frame D, which is detachably fastened to the tail of the cart by any suitable means. In said frame are journaled rollers E E', and in between said rollers is located a guideway or trough, F. Around the said rollers, and in the trough F, passes a continuous apron, G, which is stretched tightly, so as to be made to rotate from the revolution of the roller E', which is provided with a pulley, geared with the hub of one of the driving-wheels through a cross-belt, H'. As the continuous apron is made to revolve the manure is shoveled out upon the same, and is conveyed by it to an inclined chute, I, from whence it is delivered to the ground.

It will be seen from the description that the detachable frame D, lying under the body of the cart, can be attached to the rear end of any ordinary cart or wagon employed on a farm, and that the chute I is pivoted to the frame, so as to rise and fall with the inequalities of the ground in distributing the fertilizer over the field, and that by arranging the detachable frame under the bottom of the cart the fertilizer will be automatically delivered on the ground.

I know that a continuous revolving apron stretched upon rollers has been heretofore employed in a fertilizer-distributer, and do not claim such, except when combined with my detachable device, as shown and described.

Having thus described my invention, what I claim as new is—

In combination with a cart of ordinary construction, the detachable frame D provided with rollers E E', endless belt G, trough F, and pivoted chute I, the detachable frame D lying under the bottom of said cart, whereby the manure is automatically dropped upon the ground, substantially as described.

ASA C. HURLEY.

Witnesses:
   E. R. TURNER,
   ASA BELL.